(12) United States Patent  
Haida et al.

(10) Patent No.: US 9,400,406 B2  
(45) Date of Patent: Jul. 26, 2016

(54) LIQUID CRYSTAL PANEL AND LIQUID CRYSTAL DISPLAY APPARATUS

(75) Inventors: Nobuyuki Haida, Ibaraki (JP); Yuusuke Toyama, Ibaraki (JP); Takeharu Kitagawa, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 468 days.

(21) Appl. No.: 13/820,912

(22) PCT Filed: Sep. 7, 2011

(86) PCT No.: PCT/JP2011/070326  
§ 371 (c)(1),  
(2), (4) Date: Mar. 5, 2013

(87) PCT Pub. No.: WO2012/033113  
PCT Pub. Date: Mar. 15, 2012

(65) Prior Publication Data  
US 2013/0169911 A1    Jul. 4, 2013

(30) Foreign Application Priority Data  
Sep. 8, 2010  (JP) ................................ 2010-200536

(51) Int. Cl.  
*G02F 1/1335*    (2006.01)

(52) U.S. Cl.  
CPC .................... *G02F 1/133528* (2013.01)

(58) Field of Classification Search  
CPC ................................. G02F 1/133528  
See application file for complete search history.

(56) References Cited

U.S. PATENT DOCUMENTS

| 7,072,112 | B2* | 7/2006 | Ito ........................... B29C 41/28 |
| | | | 264/1.34 |
| 7,239,362 | B2 | 7/2007 | Tsuchiya |
| 7,248,311 | B2 | 7/2007 | Tsuchiya |
| 7,440,047 | B2 | 10/2008 | Tsuchiya |
| 7,651,643 | B2 | 1/2010 | Saiki et al. |
| 2004/0119914 | A1 | 6/2004 | Tsuchiya |
| 2004/0263777 | A1* | 12/2004 | Kim .............................. 351/163 |
| 2005/0078369 | A1* | 4/2005 | Blanchard ..................... 359/462 |
| 2006/0098142 | A1 | 5/2006 | Tsuchiya |

(Continued)

FOREIGN PATENT DOCUMENTS

| CN | 1499256 A | 5/2004 |
| CN | 1826542 A | 8/2006 |

(Continued)

OTHER PUBLICATIONS

Chinese Office Action dated Nov. 15, 2014, issued in corresponding Chinese Patent Application No. 201180043477.2, w/English translation (18 pages).

(Continued)

*Primary Examiner* — Timothy L Rude  
(74) *Attorney, Agent, or Firm* — Westerman, Hattori, Daniels & Adrian, LLP

(57) ABSTRACT

The present invention provides a liquid crystal panel in which warping is controlled. The liquid crystal panel includes a liquid crystal cell 20, a first polarizing film 31 disposed on a viewer side of the liquid crystal cell 20 and a second polarizing film 32 disposed on a side of the liquid crystal cell 20 opposite to the viewer side. A thickness ($d_1$) of the first polarizing film 31 is smaller than a thickness ($d_2$) of the second polarizing film 32.

10 Claims, 2 Drawing Sheets

(56) References Cited

U.S. PATENT DOCUMENTS

| | | | |
|---|---|---|---|
| 2006/0227423 A1 | 10/2006 | Saiki et al. | |
| 2007/0242189 A1 | 10/2007 | Tsuchiya | |
| 2007/0252925 A1 | 11/2007 | Takeda et al. | |
| 2007/0258032 A1* | 11/2007 | Kaihoko et al. | 349/141 |
| 2009/0231528 A1* | 9/2009 | Nakano et al. | 349/118 |
| 2009/0323185 A1 | 12/2009 | Goto et al. | |
| 2010/0027127 A1* | 2/2010 | Ooe et al. | 359/614 |
| 2010/0085641 A1 | 4/2010 | Saiki et al. | |
| 2011/0007259 A1* | 1/2011 | Okabe et al. | 349/158 |

FOREIGN PATENT DOCUMENTS

| | | |
|---|---|---|
| CN | 101063768 A | 10/2007 |
| JP | 2004-341503 A | 12/2004 |
| JP | 2007-140132 A | 6/2007 |
| JP | 2009-109995 A | 5/2009 |
| JP | 2010-33007 A | 2/2010 |

OTHER PUBLICATIONS

International Search Report for PCT/JP2011/070326, mailing date of Oct. 11, 2011.

* cited by examiner

LIQUID CRYSTAL PANEL AND LIQUID CRYSTAL DISPLAY APPARATUS

TECHNICAL FIELD

The present invention relates to a liquid crystal panel and a liquid crystal display apparatus.

BACKGROUND ART

In recent years, in an image display apparatus typified by a liquid crystal display apparatus, an increase in screen size and a reduction in thickness of the entirety of the image display apparatus have been promoted. An optical laminate having a polarizing film is disposed on each of both sides of a liquid crystal cell of the liquid crystal display apparatus, the disposition being attributable to an image-forming mode of the apparatus. In this context, various developments have been made on the optical laminate in association with the reduction in thickness of the liquid crystal display apparatus (see, for example, Patent Literature 1). However, there is a problem in that as the increase in screen size and the reduction in thickness are promoted, warping is more liable to occur in the liquid crystal panel.

CITATION LIST

Patent Literature

[PTL 1] JP 2009-109995 A

SUMMARY OF INVENTION

Technical Problem

The present invention has been made in order to solve the conventional problems, and a main object of the present invention is to provide a liquid crystal panel in which warping is controlled.

Means for Solving the Problems

According to one aspect of the present invention, a liquid crystal panel is provided. The liquid crystal panel includes a liquid crystal cell, a first polarizing film disposed on a viewer side of the liquid crystal cell and a second polarizing film disposed on a side of the liquid crystal cell opposite to the viewer side. A thickness ($d_1$) of the first polarizing film is smaller than a thickness ($d_2$) of the second polarizing film.

In one embodiment of the invention, a difference between the thickness of the second polarizing film and the thickness of the first polarizing film ($\Delta d = d_2 - d_1$) is 5 μm or more.

In another embodiment of the invention, the thickness ($d_1$) of the first polarizing film is 10 μm or less.

In still another embodiment of the invention, the thickness ($d_2$) of the second polarizing film is 15 μm or more.

In still another embodiment of the invention, the liquid crystal panel has warping that is convex to the viewer side.

In still another embodiment of the invention, a warping amount of the liquid crystal panel is +0.5 mm to +3.0 mm.

In still another embodiment of the invention, a single axis transmittance of the first polarizing film is 42.0% or more and a polarization degree of the first polarizing film is 99.95% or more.

In still another embodiment of the invention, the first polarizing film is obtained by forming a polyvinyl alcohol-based resin layer on a thermoplastic resin base material to prepare a laminate, and subjecting the laminate to underwater stretching in an aqueous solution of boric acid.

According to another aspect of the invention, a liquid crystal display apparatus is provided. The liquid crystal display apparatus includes the liquid crystal panel.

Advantageous Effects of Invention

According to the present invention, the polarizing films having different thicknesses are disposed on both sides of the liquid crystal cell, to thereby enable the control of the warping amount of the liquid crystal panel. Specifically, a polarizing film tends to undergo expansion/shrinkage through heat absorption/heat release by heating or the like. As the thickness is larger, the tendency becomes stronger, while as the thickness is smaller, dimensional stability can become more excellent. Therefore, when the thickness of the polarizing film to be disposed on the viewer side is set smaller than the thickness of the polarizing film to be disposed on the side opposite to the viewer side, the liquid crystal panel to be obtained can have warping that is convex to the viewer side. As a result, for example, the liquid crystal panel can be prevented from coming into contact with a backlight unit constituting the liquid crystal display apparatus, thereby being prevented from being damaged. In addition, the warping of the liquid crystal panel of the present invention has been controlled since its production. Accordingly, its warping amount does not substantially change, or even when the warping slightly changes, the direction of the warping changes so that the warping may be convex to the viewer side. Thus, a positional relationship with a housing constituting the liquid crystal display apparatus does not substantially change, or the positional relationship with the housing can be designed on the assumption of warping that is already convex to the viewer side at the time of the production. As a result, the liquid crystal panel can be prevented from coming into contact with the housing over time, the contact having an adverse influence on display characteristics.

DESCRIPTION OF EMBODIMENTS

Hereinafter, preferred embodiments of the present invention are described. However, the present invention is not limited to these embodiments.

A. Liquid crystal panel

Figure 1:
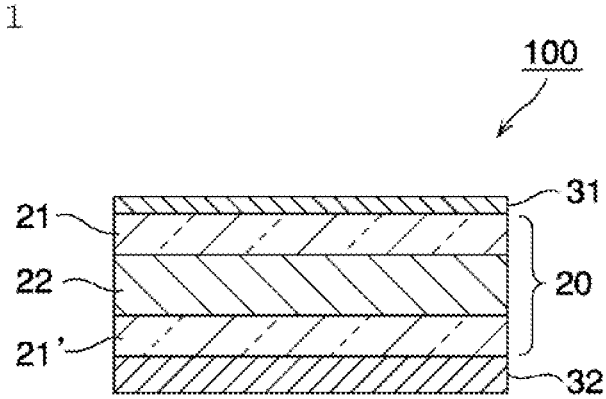
FIG. 1 is a schematic sectional view of a liquid crystal panel according to a preferred embodiment of the present invention.

FIG. 1 is a schematic sectional view of a liquid crystal panel according to a preferred embodiment of the present invention. A liquid crystal panel 100 has a liquid crystal cell 20, a first polarizing film 31 disposed on the viewer side of the liquid crystal cell 20, and a second polarizing film 32 disposed on the side of the liquid crystal cell 20 opposite to the viewer side. The liquid crystal panel 100 may further have any appropriate optical member (not shown). Examples of the optical member include a protective film and a retardation film. In a practical case, the first polarizing film and the second polarizing film are each provided with a protective film on at least one side thereof (formed into an optical laminate) in advance, and are then disposed on both sides of the liquid crystal cell.

The thickness ($d_1$) of the first polarizing film 31 disposed on the viewer side of the the liquid crystal cell 20 is smaller than the thickness ($d_2$) of the second polarizing film 32 disposed on the side of the liquid crystal cell 20 opposite to the viewer side. With such relationship, the liquid crystal panel 100 can have warping that is convex to the viewer side. As a result, when the liquid crystal panel is mounted on a liquid crystal display apparatus, the liquid crystal panel can be prevented from coming into contact with a backlight unit constituting the liquid crystal display apparatus, thereby being prevented from being damaged. In addition, the warping of the liquid crystal panel 100 has been controlled since its production. Accordingly, its warping amount does not substantially change, or even when the warping slightly changes, the direction of the warping changes so that the warping may be convex to the viewer side. Thus, a positional relationship with a housing constituting the liquid crystal display apparatus does not substantially change, or the positional relationship with the housing can be designed on the assumption of warping that is already convex to the viewer side at the time of the production. As a result, the liquid crystal panel can be prevented from coming into contact with the housing over time, the contact having an adverse influence on the display characteristics.

The warping amount of the liquid crystal panel is preferably +0.5 mm to +3.0 mm. The warping amount can be controlled by adjusting the thicknesses of the first polarizing film and the second polarizing film to be described later. It should be noted that the warping amount can be determined by extending a thread in the long side direction of a plane on the side of the liquid crystal panel opposite to the direction in which warping has occurred, and measuring a distance (at its longest) between the thread and the liquid crystal panel. Herein, warping that is convex to the viewer side is represented by Symbol "+", and warping that is convex to the side opposite to the viewer side is represented by Symbol A-1. Liquid Crystal Cell The liquid crystal cell 20 has a pair of substrates 21, 21' and a liquid crystal layer 22 as a display medium sandwiched between the substrates 21, 21'. One of the substrates (color filter substrate) is provided with a color filter and a black matrix (both not shown). The other substrate (active matrix substrate) is provided with a switching element (representatively TFT) (not shown) for controlling the electro optical characteristics of liquid crystal, scanning lines (not shown) for providing gate signals to the switching element and signal lines (not shown) for providing source signals thereto, and a pixel electrode (not shown). It should be noted that the color filter may be provided on the active matrix substrate side. A distance (cell gap) between the substrates 21, 21' is controlled by a spacer (not shown). An orientation film (not shown) made of, for example, a polyimide is provided on the side of each of the substrates 21, 21' to be brought into contact with the liquid crystal layer 22.

Any appropriate driving mode may be adopted as the driving mode of the liquid crystal cell. Specific examples of the driving mode include a super twisted nematic (STN) mode, a twisted nematic (TN) mode, an in-plane switching (IPS) mode, a vertical aligned (VA) mode, an optically aligned birefringence (OCB) mode, a hybrid aligned nematic (HAN) mode, an axially symmetric aligned microcell (ASM) mode, and an electrically controlled birefringence (ECB) mode.

A-2. Polarizing Film

As described above, the thickness ($d_1$) of the first polarizing film disposed on the viewer side of the liquid crystal cell is smaller than the thickness ($d_2$) of the second polarizing film disposed on the side of the liquid crystal cell opposite to the viewer side. A difference between the thickness of the second polarizing film and the thickness of the first polarizing film ($\Delta d = d_2 - d_1$) is preferably 5 μm or more, more preferably 10 μm or more. On the other hand, the difference ($\Delta d$) between the thicknesses is preferably 30 μm or less.

The thickness of the first polarizing film is preferably 10 μm or less, more preferably 7 μm or less. A polarizing film having such extremely small thickness can be extremely excellent in dimensional stability. The warping of the liquid crystal panel can be favorably controlled by virtue of the presence of such polarizing film. On the other hand, the thickness of the first polarizing film is preferably 2 μm or more.

The thickness of the second polarizing film is preferably 15 μm or more, more preferably 18 μm or more. On the other hand, the thickness of the second polarizing film is preferably 30 μm or less.

Any appropriate polarizing film may be used as each of the first polarizing film and the second polarizing film as long as the relationship of the thicknesses is satisfied. The polarizing film is representatively a polyvinyl alcohol-based resin film that adsorbs and orients a dichromatic substance (preferably iodine).

Any appropriate resin can be adopted as the polyvinyl alcohol-based resin. Examples of the resin include a polyvinyl alcohol and an ethylene-vinyl alcohol copolymer. The polyvinyl alcohol is obtained by saponifying a polyvinyl acetate. The ethylene-vinyl alcohol copolymer is obtained by saponifying an ethylene-vinyl acetate copolymer. The saponification degree of the polyvinyl alcohol-based resin is typically 85 mol % to 100 mol %, preferably 95.0 mol % to 99.95 mol %, more preferably 99.0 mol % to 99.93 mol %. The saponification degree can be determined in conformity with JIS K 6726-1994. The use of the polyvinyl alcohol-based resin having such saponification degree can provide a polarizing film excellent in durability. When the saponification degree is excessively high, the resin may gel.

The average polymerization degree of the polyvinyl alcohol-based resin can be appropriately selected depending on purposes. The average polymerization degree is typically 1,000 to 10,000, preferably 1,200 to 4,500, more preferably 1,500 to 4,300. It should be noted that the average polymerization degree can be determined in conformity with JIS K 6726-1994.

The polarizing film preferably shows absorption dichroism at any wavelength in the wavelength range of 380 nm to 780 nm. The single axis transmittance of the polarizing film is preferably 40.0% or more, more preferably 41.0% or more, still more preferably 42.0% or more. The polarization degree of the polarizing film is preferably 99.8% or more, more preferably 99.9% or more, still more preferably 99.95% or more.

Any appropriate method may be adopted as a method of producing the polarizing film. The polarizing film is representatively produced by appropriately subjecting a polyvinyl alcohol-based resin film to treatments such as dyeing, cross-linking, stretching, and drying.

A polarizing film that has a small thickness (for example, 10 μm or less) and can satisfy excellent optical characteristics (such as a single axis transmittance of 42.0% or more and a polarization degree of 99.95% or more) is, as described above, suitably used as the first polarizing film. Such polarizing film (hereinafter, sometimes referred to as "thin polarizing film") can be produced, for example, by forming a polyvinyl alcohol-based resin layer on a thermoplastic resin base material to prepare a laminate (step A), and subjecting the laminate to underwater stretching in an aqueous solution of boric acid (step B). This embodiment is described below.

(Step A)

Figure 2:
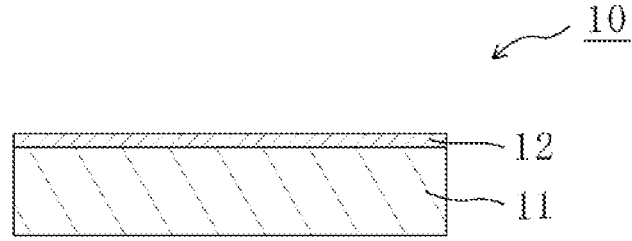
FIG. 2 is a schematic sectional view of a laminate according to a preferred embodiment.

In the step A, the laminate is prepared. FIG. 2 is a schematic sectional view of a laminate according to a preferred embodiment. A laminate 10 has a thermoplastic resin base material 11 and a polyvinyl alcohol-based resin layer 12, and is prepared by forming the polyvinyl alcohol-based resin layer 12 on the thermoplastic resin base material 11. Any appropriate method may be adopted as a method of forming the polyvinyl alcohol-based resin layer 12. The polyvinyl alcohol-based resin layer 12 is preferably formed by applying an application liquid containing a polyvinyl alcohol-based resin onto the thermoplastic resin base material 11 and drying the liquid.

Any appropriate material can be adopted as a constituent material for the thermoplastic resin base material. Amorphous (uncrystallized) polyethylene terephthalate-based resins are each preferably used as the constituent material for the thermoplastic resin base material. Of those, a noncrystalline (hard-to-crystallize) polyethylene terephthalate-based resin is particularly preferably used. Specific examples of the noncrystalline polyethylene terephthalate-based resin include a copolymer further containing isophthalic acid as a dicarboxylic acid and a copolymer further containing cyclohexane dimethanol as a glycol.

The thermoplastic resin base material absorbs water in the step B to be described later and the water serves a plastic function so that the base material can plasticize. As a result, a stretching stress can be significantly reduced. Accordingly, the stretching can be performed at a high ratio and the stretchability of the thermoplastic resin base material can be more excellent than that at the time of in-air stretching. As a result, a thin polarizing film having excellent optical characteristics (such as polarization degree) can be produced. In one embodiment, the percentage of water absorption of the thermoplastic resin base material is preferably 0.2% or more, more preferably 0.3% or more. Meanwhile, the percentage of water absorption of the thermoplastic resin base material is preferably 3.0% or less, more preferably 1.0% or less. The use of such thermoplastic resin base material can prevent, for example, the following inconvenience. The dimensional stability of the thermoplastic resin base material remarkably reduces at the time of the production and hence the external appearance of the thin polarizing film to be obtained deteriorates. In addition, the use can prevent the rupture of the base material at the time of the underwater stretching and the release of the polyvinyl alcohol-based resin layer from the thermoplastic resin base material. It should be noted that the percentage of water absorption is a value determined in conformity with JIS K 7209.

The glass transition temperature (Tg) of the thermoplastic resin base material is preferably 170° C. or less. The use of such thermoplastic resin base material can sufficiently secure the stretchability of the laminate while suppressing the crystallization of the polyvinyl alcohol-based resin layer. Further, the glass transition temperature is more preferably 120° C. or less in consideration of the plasticization of the thermoplastic resin base material by water and favorable performance of the underwater stretching. In one embodiment, the glass transition temperature of the thermoplastic resin base material is preferably 60° C. or more. The use of such thermoplastic resin base material prevents an inconvenience such as the deformation of the thermoplastic resin base material (e.g., the occurrence of unevenness, a slack, or a wrinkle) during the application and drying of the application liquid containing the polyvinyl alcohol-based resin, thereby enabling favorable production of the laminate. In addition, the use enables favorable stretching of the polyvinyl alcohol-based resin layer at a suitable temperature (e.g., about 60° C.). In another embodiment, a glass transition temperature lower than 60° C. is permitted as long as the thermoplastic resin base material does not deform during the application and drying of the application liquid containing the polyvinyl alcohol-based resin. It should be noted that the glass transition temperature of the thermoplastic resin base material can be adjusted by, for example, introducing a denaturation group into the constituent material or heating the base material constituted of a crystallization material. The glass transition temperature (Tg) is a value determined in conformity with JIS K 7121.

The thickness of the thermoplastic resin base material before the stretching is preferably 20 μm to 300 μm, more preferably 50 μm to 200 μm. When the thickness is less than 20 μm, it may be difficult to form the polyvinyl alcohol-based resin layer. When the thickness exceeds 300 μm, in, for example, the step B, it may take a long time for the thermoplastic resin base material to absorb water, and an excessively large load may be needed in the stretching.

The application liquid is representatively a solution prepared by dissolving the polyvinyl alcohol-based resin in a solvent. Examples of the solvent include water, dimethylsulfoxide, dimethylformamide, dimethylacetamide, N-methylpyrrolidone, various glycols, polyhydric alcohols such as trimethylolpropane, and amines such as ethylenediamine and diethylenetriamine. One kind of those solvents can be used alone, or two or more kinds thereof can be used in combination. Of those, water is preferred. The concentration of the polyvinyl alcohol-based resin of the solution is preferably 3 parts by weight to 20 parts by weight with respect to 100 parts by weight of the solvent. At such resin concentration, a uniform coating film in close contact with the thermoplastic resin base material can be formed.

The application liquid may be compounded with an additive. Examples of the additive include a plasticizer and a surfactant. Examples of the plasticizer include polyhydric alcohols such as ethylene glycol and glycerin. Examples of the surfactant include nonionic surfactants. Such additive can be used for the purpose of additionally improving the uniformity, dyeing property, or stretchability of the polyvinyl alcohol-based resin layer to be obtained.

Any appropriate method can be adopted as a method of applying the application liquid. Examples of the method include a roll coating method, a spin coating method, a wire bar coating method, a dip coating method, a die coating method, a curtain coating method, a spray coating method, and a knife coating method (comma coating method or the like).

The application liquid is preferably applied and dried at a temperature of 50° C. or more.

The thickness of the polyvinyl alcohol-based resin layer before the stretching is preferably 3 μm to 20 μm.

The thermoplastic resin base material may be subjected to a surface treatment (such as a corona treatment) before the formation of the polyvinyl alcohol-based resin layer. Alternatively, an easy-adhesion layer may be formed on the thermoplastic resin base material. Performing such treatment can improve adhesiveness between the thermoplastic resin base material and the polyvinyl alcohol-based resin layer.

(Step B)

In the step B, the laminate is subjected to underwater stretching (boric acid underwater stretching). According to the underwater stretching, the stretching can be performed at a temperature lower than the glass transition temperature (representatively about 80° C.) of each of the thermoplastic resin base material and the polyvinyl alcohol-based resin layer, and hence the polyvinyl alcohol-based resin layer can be stretched at a high ratio while its crystallization is suppressed. As a result, a thin polarizing film having excellent optical characteristics (such as polarization degree) can be produced.

Any appropriate method may be adopted as a method of stretching the laminate. Specifically, fixed-end stretching may be adopted, or free-end stretching (such as a method involving passing the laminate between rolls having different peripheral speeds to uniaxially stretch the laminate) may be adopted. The stretching of the laminate may be performed in one stage, or may be performed in a plurality of stages. When the stretching is performed in a plurality of stages, a stretching ratio (maximum stretching ratio) to be described later is the product of stretching ratios in the respective stages.

The underwater stretching is preferably performed by immersing the laminate in an aqueous solution of boric acid (boric acid underwater stretching). The use of the aqueous solution of boric acid as a stretching bath can impart, to the polyvinyl alcohol-based resin layer, rigidity enough to withstand a tension to be applied at the time of the stretching and such water resistance that the layer does not dissolve in water. Specifically, boric acid can produce a tetrahydroxyborate anion in the aqueous solution to cross-link with the polyvinyl alcohol-based resin through a hydrogen bond. As a result, the polyvinyl alcohol-based resin layer can be favorably stretched with the aid of the rigidity and the water resistance imparted thereto, and hence a thin polarizing film having excellent optical characteristics (such as polarization degree) can be produced.

The aqueous solution of boric acid is preferably obtained by dissolving boric acid and/or a borate in water as a solvent. The concentration of boric acid is preferably 1 part by weight to 10 parts by weight with respect to 100 parts by weight of water. Setting the concentration of boric acid to 1 part by weight or more can effectively suppress the dissolution of the polyvinyl alcohol-based resin layer, thereby enabling the production of a thin polarizing film having additionally high characteristics. It should be noted that an aqueous solution obtained by dissolving a boron compound such as borax, glyoxal, glutaric aldehyde, or the like as well as boric acid or the borate in the solvent may also be used.

When the polyvinyl alcohol-based resin layer has been caused to adsorb a dichromatic substance (representatively iodine) in advance through the dyeing step to be described later, the stretching bath (aqueous solution of boric acid) is preferably compounded with an iodide. Compounding the bath with the iodide can suppress the elution of iodine which the polyvinyl alcohol-based resin layer has been caused to adsorb. Examples of the iodide include potassium iodide, lithium iodide, sodium iodide, zinc iodide, aluminum iodide, lead iodide, copper iodide, barium iodide, calcium iodide, tin iodide, and titanium iodide. Of those, potassium iodide is preferred. The concentration of the iodide is preferably 0.05 part by weight to 15 parts by weight, more preferably 0.5 part by weight to 8 parts by weight with respect to 100 parts by weight of water.

A stretching temperature (liquid temperature of stretching bath) in the step B is preferably 40° C. to 85° C., more preferably 50° C. to 85° C. At such temperature, the polyvinyl alcohol-based resin layer can be stretched at a high ratio while its dissolution is suppressed. Specifically, as described above, the glass transition temperature (Tg) of the thermoplastic resin base material is preferably 60° C. or more in relation to the formation of the polyvinyl alcohol-based resin layer. In this case, when the stretching temperature falls short of 40° C., there is a risk that the stretching cannot be favorably performed even in consideration of the plasticization of the thermoplastic resin base material by water. On the other hand, as the temperature of the stretching bath increases, the solubility of the polyvinyl alcohol-based resin layer is raised and hence excellent optical characteristics may not be obtained. The laminate is preferably immersed in the stretching bath for a time of 15 seconds to 5 minutes.

When the underwater stretching (boric acid underwater stretching) is adopted, the stretching can be performed at a high ratio, and hence a thin polarizing film having excellent optical characteristics (such as polarization degree) can be produced. Specifically, a maximum stretching ratio is preferably 5.0 times or more with respect to the original length of the laminate. The term "maximum stretching ratio" as used in the description refers to a stretching ratio immediately before the rupture of the laminate. The stretching ratio at which the laminate ruptures is separately identified and a value lower than the value by 0.2 is the maximum stretching ratio. In addition, in the stretching of the laminate using of the thermoplastic resin base material, the maximum stretching ratio of the underwater stretching may be higher than the maximum stretching ratio of the in-air stretching.

(Any other Step)

As described above, this embodiment may also include any other step except the the step A and the step B. Examples of the other step include an in solubilizing step, a dyeing step, a cross-linking step, a stretching step (different from the step B), a washing step, and a drying (moisture content adjusting) step. The other step may be performed at any appropriate timing.

The dyeing step is representatively a step of dyeing the polyvinyl alcohol-based layer with a dichromatic substance. The dyeing is preferably performed by causing the polyvinyl alcohol-based layer to adsorb the dichromatic substance. A method for the adsorption is, for example, a method involving immersing the polyvinyl alcohol-based resin layer (laminate) in a dyeing liquid containing the dichromatic substance, a method involving applying the dyeing liquid onto the polyvinyl alcohol-based resin layer, or a method involving spraying the dyeing liquid onto the polyvinyl alcohol-based resin layer. Of those, a method involving immersing the laminate in the dyeing liquid containing the dichromatic substance is preferred. This is because the dichromatic substance can favorably adsorb to the layer.

Examples of the dichromatic substance include iodine and a dichromatic dye. Of those, iodine is preferred. When iodine is used as the dichromatic substance, the dyeing liquid is an aqueous solution of iodine. The compounding amount of iodine is preferably 0.1 part by weight to 0.5 part by weight with respect to 100 parts by weight of water. The aqueous solution of iodine is preferably compounded with an iodide in order that the solubility of iodine in water may be increased. Specific examples of the iodide are as described above. The compounding amount of the iodide is preferably 0.02 part by weight to 20 parts by weight, more preferably 0.1 part by weight to 10 parts by weight with respect to 100 parts by weight of water. The liquid temperature of the dyeing liquid at the time of the dyeing is preferably 20° C. to 50° C. in order that the dissolution of the polyvinyl alcohol-based resin may be suppressed. When the polyvinyl alcohol-based resin layer is immersed in the dyeing liquid, an immersion time is preferably 5 seconds to 5 minutes in order that the transmittance of the polyvinyl alcohol-based resin layer may be secured.

The dyeing step is preferably performed before the step B.

The in solubilizing step is representatively performed by immersing the polyvinyl alcohol-based resin layer in an aqueous solution of boric acid. Water resistance can be imparted to the polyvinyl alcohol-based resin layer by subjecting the layer to an in solubilizing treatment. The concentration of the aqueous solution of boric acid is preferably 1 part by weight to 4 parts by weight with respect to 100 parts by weight of water. The liquid temperature of an in solubilizing bath (the aqueous solution of boric acid) is preferably 20° C. to 40° C. The in solubilizing step is preferably performed after the preparation of the laminate and before the dyeing step or the step B.

The cross-linking step is representatively performed by immersing the polyvinyl alcohol-based resin layer in an aqueous solution of boric acid. Water resistance can be imparted to the polyvinyl alcohol-based resin layer by subjecting the layer to a cross-linking treatment. The concentration of the aqueous solution of boric acid is preferably 1 part by weight to 4 parts by weight with respect to 100 parts by weight of water. In addition, when the cross-linking step is performed after the dyeing step, the solution is preferably further compounded with an iodide. Compounding the solution with the iodide can suppress the elution of iodine which the polyvinyl alcohol-based resin layer has been caused to adsorb. The compounding amount of the iodide is preferably 1 part by weight to 5 parts by weight with respect to 100 parts by weight of water. Specific examples of the iodide are as described above. The liquid temperature of a cross-linking bath (the aqueous solution of boric acid) is preferably 20° C. to 50° C. The cross-linking step is preferably performed before the step B. In a preferred embodiment, the dyeing step, the cross-linking step, and the step B are performed in the stated order.

The washing step is representatively performed by immersing the polyvinyl alcohol-based resin layer in an aqueous solution of potassium iodide. A drying temperature in the drying step is preferably 30° C. to 100° C.

Figure 3:
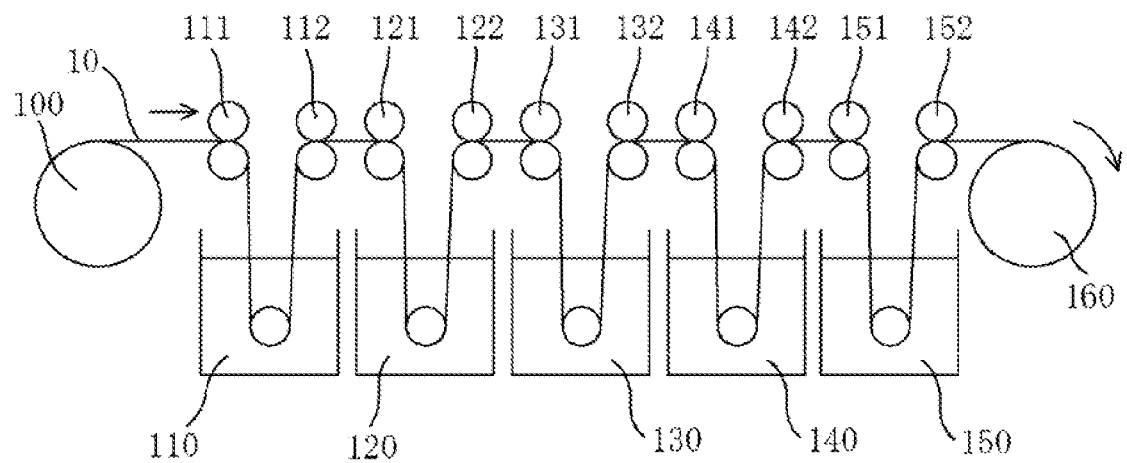
FIG. 3 is a schematic view illustrating an example of a method of producing a thin polarizing film to be used in the present invention.

FIG. 3 is a schematic view illustrating an example of the method of producing a thin polarizing film of the present invention. The laminate 10 is fed from a feeding portion 100, and is then immersed in a bath 110 of an aqueous solution of boric acid by rolls 111 and 112 (the in solubilizing step). After that, the laminate is immersed in a bath 120 of an aqueous solution of a dichromatic substance (iodine) and potassium iodide by rolls 121 and 122 (the dyeing step). Next, the laminate is immersed in a bath 130 of an aqueous solution of boric acid and potassium iodide by rolls 131 and 132 (the cross-linking step). After that, the laminate 10 is stretched through the application of a tension in its longitudinal direction (lengthwise direction) with rolls 141 and 142 having different speed ratios while being immersed in a bath 140 of an aqueous solution of boric acid (the step B). The laminate 10 subjected to the stretching treatment is immersed in a bath 150 of an aqueous solution of potassium iodide by rolls 151 and 152 (the washing step), and is then subjected to the drying step (not shown). After that, the laminate is wound by a winding portion 160.

A-3. Protective Film

Any appropriate film usable as a protective film for a polarizing film may be adopted as the protective film. A material that serves as a main component of such film is specifically exemplified by a cellulose-based resin such as triacetylcellulose (TAC), and transparent resins such as a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, an acrylic resin, and an acetate-based resin. Other examples thereof include an acrylic, urethane-based, acrylic urethane-based, epoxy-based, or silicone-based thermosetting resin and a UV-curable resin. Still other examples thereof include a glassy polymer such as a siloxane-based polymer. In addition, a polymer film described in JP 2001-343529 A (WO 01/37007 A1) may also be used. As a material for the film, there may be used, for example, a resin composition containing a thermoplastic resin having a substituted or unsubstituted imide group on a side chain, and a thermoplastic resin having a substituted or unsubstituted phenyl group and a nitrile group on a side chain, such as a resin composition containing an alternating copolymer formed of isobutene and N-methylmaleimide and an acrylonitrile/styrene copolymer. The polymer film may be an extruded product of the resin composition, for example. Of those, TAC, a polyimide-based resin, a polyvinyl alcohol-based resin, and a glassy polymer are preferred, and TAC is more preferred.

The thickness of the protective film is preferably 20 μm to 100 μm.

It should be noted that when the method of producing the thin polarizing film is adopted, the resultant thin polarizing film may be used in a state of being integrated with the thermoplastic resin base material. In this case, the thermoplastic resin base material can function as a protective film.

A-4. Others

The liquid crystal panel of the present invention is produced by laminating the first polarizing film on the viewer side of a liquid crystal cell, and laminating the second polarizing film on the side of the liquid crystal cell opposite to the viewer side. Any appropriate method may be adopted as a method of laminating each layer (member). Specifically, each layer is laminated through any appropriate pressure-sensitive adhesive layer or adhesive layer.

B. Liquid Crystal Display Apparatus

A liquid crystal display apparatus of the present invention has the liquid crystal panel. The liquid crystal display apparatus representatively has a backlight unit. In this case, the first polarizing film and second polarizing film of the liquid crystal panel are disposed so as to be on the viewer side and the backlight side, respectively.

EXAMPLES

Hereinafter, the present invention is specifically described by way of examples. However, the present invention is not limited by these examples. It should be noted that methods of measuring the respective characteristics are as described below.

1. Thickness

Measurement was performed with a digital micrometer (manufactured by Anritsu Corporation, product name "KC-351C").

2. Percentage of water absorption of thermoplastic resin base material

Measurement was performed in conformity with JIS K 7209.

3. Glass transition temperature (Tg) of thermoplastic resin base material

Measurement was performed in conformity with JIS K 7121.

4. Polarization degree

The single axis transmittance (Ts), parallel transmittance (Tp), and crossed transmittance (Tc) of a polarizing film were measured with an ultraviolet-visible spectrophotometer (manufactured by JASCO Corporation, product name "V7100"), and then its polarization degree (P) was determined from the following equation. It should be noted that the Ts, the Tp, and the Tc are Y values measured with the two-degree field of view (C light source) of JIS Z 8701 and subjected to visibility correction.

$$\text{Polarization degree }(P)\text{ (\%)}=\{(Tp-Tc)/(Tp+Tc)\}^{1/2}\times100$$

Example 1

(Preparation of First Polarizing Film)

An amorphous polyethylene terephthalate (A-PET) film (manufactured by Mitsubishi Plastics, Inc., trade name "NOVACLEAR," thickness: 100 μm) having a percentage of water absorption of 0.60% and a Tg of 80° C. was used as a thermoplastic resin base material.

An aqueous solution of a polyvinyl alcohol (PVA) resin (manufactured by The Nippon Synthetic Chemical Industry Co., Ltd., trade name "Gohsenol (trademark) NH-26") having a polymerization degree of 2,600 and a saponification degree of 99.9% was applied onto one surface of the thermoplastic resin base material at 60° C. and dried at 60° C. so that a polyvinyl alcohol-based resin layer having a thickness of 12 μm was formed. Thus, a laminate was prepared.

The resultant laminate was immersed in an in solubilizing bath having a liquid temperature of 30° C. (an aqueous solution of boric acid obtained by compounding 100 parts by weight of water with 4 parts by weight of boric acid) for 30 seconds (in solubilizing step).

Next, the laminate was immersed in a dyeing bath having a liquid temperature of 30° C. (an aqueous solution of iodine obtained by compounding 100 parts by weight of water with 0.2 part by weight of iodine and 2 parts by weight of potassium iodide) for 60 seconds (dyeing step).

Next, the laminate was immersed in a cross-linking bath having a liquid temperature of 30° C. (an aqueous solution of boric acid obtained by compounding 100 parts by weight of water with 3 parts by weight of potassium iodide and 3 parts by weight of boric acid) for 30 seconds (cross-linking step).

After that, the laminate was uniaxially stretched in its longitudinal direction (lengthwise direction) between rolls having different peripheral speeds while being immersed in an aqueous solution of boric acid having a liquid temperature of 60° C. (an aqueous solution obtained by compounding 100 parts by weight of water with 4 parts by weight of boric acid and 5 parts by weight of potassium iodide) (stretching step). The laminate was immersed in the aqueous solution of boric acid for a time of 120 seconds, and the stretching ratio was set to 5.0 times.

After that, the laminate was immersed in a washing bath (an aqueous solution obtained by compounding 100 parts by weight of water with 3 parts by weight of potassium iodide), and was then dried with warm air at 60° C. (washing and drying step).

Thus, a laminate having a polarizing film having a thickness of 5 μm formed on the thermoplastic resin base material was obtained. The resultant polarizing film had a single axis transmittance (Ts) of 42.2% and a polarization degree (P) of 99.96%.

(Preparation of Optical Laminate 1)

An adhesive was applied onto the polarizing film side of the resultant laminate, and a triacetylcellulose film (TAC film) having a thickness of 80 μm was attached to the resultant. Next, the thermoplastic resin base material was released, an adhesive was applied onto the surface, and a TAC film having a thickness of 80 μm was attached to the resultant. After that, a pressure-sensitive adhesive layer was formed on one of the TAC film surfaces. Thus, an optical laminate 1 having a construction "TAC film/polarizing film (thickness: 5 μm)/TAC film/pressure-sensitive adhesive layer" was prepared.

Preparation of Second Polarizing Film

A polyvinyl alcohol film having a thickness of 75 μm was immersed in warm water at 28° C. for 60 seconds to be swelled. Next, the film was immersed in an aqueous solution containing iodine and potassium iodide (weight ratio: 1:10), and was dyed so as to have a predetermined single axis transmittance while being stretched to 3.3 times. After that, the film was immersed in an aqueous solution containing 3 wt % of boric acid and 2 wt % of potassium iodide for 10 seconds, and was then stretched in an aqueous solution at 60° C. containing 4 wt % of boric acid and 3 wt % of potassium iodide so that the stretching ratio was 6.0 times in total. After that, the resultant stretched film was immersed in an aqueous solution containing 5 wt % of potassium iodide for 10 seconds, and dried in an oven at 40° C. for 3 minutes. Thus, a polarizing film having a thickness of 25 μm was obtained.

(Preparation of Optical Laminate 2)

An adhesive was applied onto each of both sides of the resultant polarizing film, and TAC films each having a thickness of 80 μm were attached to the resultant. After that, a pressure-sensitive adhesive layer was formed on one of the TAC film surfaces. Thus, an optical laminate 2 having a construction "TAC film/polarizing film (thickness: 25 μm)/TAC film/pressure-sensitive adhesive layer" was prepared.

(Production of Liquid Crystal Panel)

An optical laminate on the side of a liquid crystal panel (manufactured by IPS Alpha Technology Ltd., 37" panel) opposite to its viewer side was removed, and the optical laminate 2 was mounted on the liquid crystal cell. Next, an optical laminate on the viewer side was removed, and the optical laminate 1 was mounted on the liquid crystal cell. Here, the mounting was performed so that the absorption axis of the polarizing film of the optical laminate 1 and the absorption axis of the polarizing film of the optical laminate 2 were substantially perpendicular to each other. Thus, a liquid crystal panel was produced.

Comparative Example 1

A liquid crystal panel was produced in the same manner as in Example 1 except that the optical laminate 2 was disposed on each of both sides of the liquid crystal cell.

Comparative Example 2

A liquid crystal panel was produced in the same manner as in Example 1 except that the optical laminate 2 was disposed on the viewer side of the liquid crystal cell and the optical laminate 1 was disposed on the side opposite to the viewer side.

Figure 4:
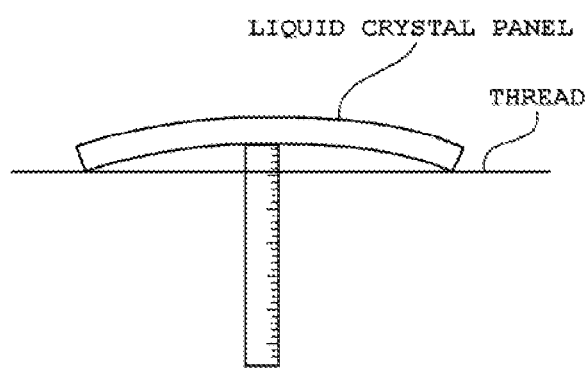
FIG. 4 is a schematic view illustrating a method of measuring a warping amount.

The resultant liquid crystal panel was loaded in a thermostatic chamber held at 80° C. for 50 hours. Twenty-four hours after being taken out of the thermostatic chamber, the liquid crystal panel was measured for its warping amount. As illustrated in FIG. 4, the warping amount was determined by extending a thread in the long side direction of a plane on the side of the liquid crystal panel opposite to the direction in which warping occurred, and measuring a distance (at its longest) between the thread and the liquid crystal panel. Table 1 shows the result of the measurement together with the warping amount before loading into the thermostatic chamber. It should be noted that warping that is convex to the viewer side is represented by Symbol "+", and warping that is convex to the side opposite to the viewer side is represented by Symbol "−".

TABLE 1

| | Thickness of polarizing film | | Warping amount | |
|---|---|---|---|---|
| | Viewer side | Backlight side | Before loading | After loading |
| Example 1 | 5 μm | 25 μm | −0.1 mm | +1.2 mm |
| Comparative Example 1 | 25 μm | 25 μm | 0 mm | −0.4 mm |
| Comparative Example 2 | 25 μm | 5 μm | 0 mm | −1.5 mm |

In Example 1, there occurred warping that was convex to the viewer side of the liquid crystal panel.

INDUSTRIAL APPLICABILITY

The liquid crystal panel of the present invention is suitably used for a large liquid crystal panel of a liquid crystal television, a liquid crystal display, or the like.

REFERENCE SIGNS LIST 20 liquid crystal cell
31 first polarizing film
32 second polarizing film
100 liquid crystal panel

The invention claimed is:

1. A liquid crystal panel, comprising:
a liquid crystal cell;
a first polarizing film disposed on a viewer side of the liquid crystal cell; and
a second polarizing film disposed on a side of the liquid crystal cell opposite to the viewer side,
wherein a thickness ($d_1$) of the first polarizing film is smaller than a thickness ($d_2$) of the second polarizing film and the thickness ($d_1$) of the first polarizing film is 2 μm or more
wherein the liquid crystal panel has warping that is convex to the view side, and
wherein a warping amount of the liquid crystal panel is +0.5 mm to +3.0 mm.

2. A liquid crystal panel according to claim 1, wherein a difference between the thickness of the second polarizing film and the thickness of the first polarizing film ($\Delta d = d_2 - d_1$) is 5 μm or more.

3. A liquid crystal panel according to claim 2, wherein the thickness ($d_1$) of the first polarizing film is 10 μm or less.

4. A liquid crystal panel according to claim 3, wherein the thickness ($d_2$) of the second polarizing film is 15 μm or more.

5. A liquid crystal panel according to claim 1, wherein the thickness ($d_1$) of the first polarizing film is 10 μm or less.

6. A liquid crystal panel according to claim 5, wherein the thickness ($d_2$) of the second polarizing film is 15 μm or more.

7. A liquid crystal panel according to claim 1, wherein a single axis transmittance of the first polarizing film is 42.0% or more and a polarization degree of the first polarizing film is 99.95% or more.

8. A liquid crystal panel according to claim 7, wherein the first polarizing film is obtained by forming a polyvinyl alcohol-based resin layer on a thermoplastic resin base material to prepare a laminate, and subjecting the laminate to underwater stretching in an aqueous solution of boric acid.

9. A liquid crystal panel according to claim 1, wherein the first polarizing film is obtained by forming a polyvinyl alcohol-based resin layer on a thermoplastic resin base material to prepare a laminate, and subjecting the laminate to underwater stretching in an aqueous solution of boric acid.

10. A liquid crystal display apparatus, comprising the liquid crystal panel according to claim 1.

* * * * *